US012584754B2

(12) United States Patent
Koshiji et al.

(10) Patent No.: US 12,584,754 B2
(45) Date of Patent: Mar. 24, 2026

(54) PATH SEARCH APPARATUS, PATH SEARCH METHOD, AND PROGRAM

(71) Applicant: NTT, Inc., Tokyo (JP)

(72) Inventors: Kojun Koshiji, Tokyo (JP); Hanami Yokoi, Tokyo (JP); Yasuharu Kaneko, Tokyo (JP); Tatsuya Matsukawa, Tokyo (JP); Mika Ishizuka, Tokyo (JP); Takafumi Hamano, Tokyo (JP)

(73) Assignee: NTT, Inc., Tokyo (JP)

( * ) Notice: Subject to any disclaimer, the term of this patent is extended or adjusted under 35 U.S.C. 154(b) by 306 days.

(21) Appl. No.: 18/559,696

(22) PCT Filed: May 26, 2021

(86) PCT No.: PCT/JP2021/020087
§ 371 (c)(1),
(2) Date: Nov. 17, 2023

(87) PCT Pub. No.: WO2022/249365
PCT Pub. Date: Dec. 1, 2022

(65) Prior Publication Data
US 2025/0123110 A1      Apr. 17, 2025

(51) Int. Cl.
*H04L 12/66* (2006.01)
*G01C 21/34* (2006.01)

(52) U.S. Cl.
CPC ................................. *G01C 21/3446* (2013.01)

(58) Field of Classification Search
CPC ....... H04L 45/123; H04L 45/02; H04L 45/12; H04L 45/124; H04L 45/48; H04L 45/16;
(Continued)

(56) References Cited

U.S. PATENT DOCUMENTS 6,791,104 B2 * 9/2004 Tansu ..................... B82Y 20/00
257/14
10,298,488 B1 * 5/2019 Wood ...................... H04L 45/12
(Continued)

FOREIGN PATENT DOCUMENTS

JP          2018-137718          8/2018

OTHER PUBLICATIONS

Kentaro Aburada et al., "Evaluation of Robust Zone-based Hierarchical Routing Method for Ad Hoc Networks", IPSJ SIG Technical Reports vol. 50(2006-MBL-037), May 19, 2006, pp. 119-124.
(Continued)

*Primary Examiner* — Kharye Pope
(74) *Attorney, Agent, or Firm* — IPUSA, PLLC

(57) ABSTRACT

A route search device includes a memory and a processor configured to divide a communication network including a plurality of nodes and an edge connecting the nodes into a plurality of areas based on information of the nodes, and create a first network graph that represents a connection relationship between the areas; search for one or more first routes from a start point area including a start point node to an end point area including an end point node using the first network graph; and search for one or more second routes from the start point node to the end point node using a second network graph that represents a connection relationship between the nodes and the edge in areas included in the first routes.

10 Claims, 15 Drawing Sheets

(58) Field of Classification Search
CPC ......... H04L 45/22; H04L 45/24; H04L 45/64;
H04L 47/122; H04L 43/0882; H04L
45/122; H04L 41/145; H04L 41/0663;
H04L 45/44; H04L 41/12; H04L 47/125;
H04L 41/0654; H04L 43/045; H04L
41/122; H04L 41/0873; H04B 10/25;
H04B 10/27; H04B 3/544; H04W 40/02;
H04W 40/04; H04W 40/00; H04W 84/18;
H04W 12/102; H04W 40/24; H04Q
11/0062; H04Q 11/0005; H04Q 2011/009
See application file for complete search history.

(56) References Cited

U.S. PATENT DOCUMENTS

| | | | | |
|---|---|---|---|---|
| 11,489,758 | B1 * | 11/2022 | Jain ......................... | H04L 45/24 |
| 2009/0228575 | A1 * | 9/2009 | Thubert ................ | H04W 40/28 |
| | | | | 709/220 |
| 2009/0296719 | A1 * | 12/2009 | Maier ..................... | H04L 47/29 |
| | | | | 370/400 |
| 2013/0070617 | A1 * | 3/2013 | Clow ..................... | H04L 45/12 |
| | | | | 370/252 |
| 2016/0182355 | A1 * | 6/2016 | Traxler ................. | H04L 45/122 |
| | | | | 370/359 |
| 2017/0222912 | A1 * | 8/2017 | Atkinson ................ | H04L 45/12 |
| 2018/0063608 | A1 * | 3/2018 | Prakash .............. | H04J 14/0257 |
| 2018/0097725 | A1 * | 4/2018 | Wood ..................... | H04L 45/50 |
| 2022/0231938 | A1 * | 7/2022 | Jain ....................... | H04L 45/122 |

OTHER PUBLICATIONS

Kentaro Aburada et al., "Proposal and its evaluations of hierarchical multiple-route routing protocol for ad hoc network", Faculty of Engineering, University of Miyazaki vol. 36, 2007, pp. 273-280.
Takuya Yamamoto et al., "A Segmentation and Design Method for Large-Scale Optical Path Networks based on Traffic Distribution Information", IEICE Technical Report PN2007-31, 2007, pp. 7-11.

* cited by examiner

| NODES A | | NODES Z | | DISTANCES | EDGE NUMBERS |
|---|---|---|---|---|---|
| NUMBERS | NODE TYPES | NUMBERS | NODE TYPES | | |
| N1 | OXC | N2 | OXC | 15 | 1001 |
| N1 | OXC | N2 | Thru | 15 | 1002 |
| N1 | OXC | N3 | OXC | 30 | 1002 |
| N1 | OXC | N3 | REP | 30 | 1003 |
| ... | | ... | | | |
| N6 | OXC | N8 | OXC | 40 | 1010 |
| N18 | OXC | N19 | OXC | 20 | 1029 |

| NODES A | NODES Z |
|---------|---------|
| AN1 | AN2 |
| AN2 | AN3 |
| ⋮ | |
| AN6 | AN7 |

| NODES | x COORDINATES | y COORDINATES |
|---|---|---|
| N1 | 40.82740133 | 140.7360972 |
| N2 | 38.25556847 | 140.3396973 |
| ⋮ | | |

START

S701
ACQUIRE TOPOLOGY INFORMATION

S702
DETERMINE DIVISION AREAS

S703
CREATE NETWORK GRAPH FOR MACRO SEARCH

S704
DETERMINE ROUTE SEARCH CONDITIONS

S705
PERFORM MACRO SEARCH

S706
CREATE NETWORK GRAPHS FOR MICRO SEARCH

S707
PERFORM MICRO SEARCH

S708
DETERMINE ROUTES THAT SATISFY REQUIREMENT

END

| AREA NODE ROUTE INFORMATION 1 | AREA NODE ROUTE INFORMATION 2 |
|---|---|
| AN1-AN2-AN3 | AN1-AN4-AN3 |
| AN1-AN2-AN3 | AN1-AN4-AN6-AN3 |
| AN1-AN2-AN3 | AN1-AN4-AN5-AN6-AN3 |
| ⋮ | |

| ROUTES 1 | | | ROUTES 2 | | | | DISTANCE SUMS | OXC NUMBER SUMS |
|---|---|---|---|---|---|---|---|---|
| ROUTE INFORMATION | TOTAL DISTANCES | NUMBERS OF OXCS | ROUTE INFORMATION | TOTAL DISTANCES | NUMBERS OF OXCS | | | |
| N2–N5–N7–N8 | 120 | 4 | N2–N4–N9–N11–N10–N8 | 180 | 6 | | 300 | 10 |
| N2–N3–N5–N7–N8 | 140 | 5 | N2–N4–N9–N11–N10–N8 | 180 | 6 | | 320 | 11 |
| N2–N3–N5–N6–N8 | 160 | 5 | N2–N4–N9–N11–N10–N8 | 180 | 6 | | 340 | 11 |
| ⋮ | | | | | | | | |

PATH SEARCH APPARATUS, PATH SEARCH METHOD, AND PROGRAM

TECHNICAL FIELD

The present invention relates to a route search device, a route search method, and a program.

BACKGROUND ART

In a communication network including a plurality of nodes and edges connecting the nodes, a technology has been known that searches for an appropriate route between a start point node and an end point node.

Furthermore, a route calculation device has also been known that calculates partial routes by dividing a communication network into a plurality of meshes (rectangular regions), and calculates a route from a start point node to an end point node by joining the partial routes (see, for example, Patent Literature 1).

CITATION LIST

Patent Literature

Patent Literature 1: JP 2018-137718 A

SUMMARY OF INVENTION

Technical Problem

In the conventional technology disclosed in Patent Literature 1, since division into a plurality of meshes is performed based on geographic information such as a hazard map, map information, or the like, the division method is limited to a rectangular region. Therefore, in the conventional technology, when partial routes are calculated, there has been an issue that there may be a case where a route that is originally desired to be created is not searched for, and many similar routes are searched for and a significant calculation time is required.

An embodiment of the present invention has been made in view of the above issue, and enables efficient search for an appropriate route in a communication network including a plurality of nodes and edges connecting the nodes.

Solution to Problem

In order to solve the above issue, a route search device according to an embodiment of the present invention includes an area division unit that divides a communication network including a plurality of nodes and an edge connecting the nodes into a plurality of areas based on information of the nodes, and creates a first network graph that represents a connection relationship between the areas, a first route search unit that searches for one or more first routes from a start point area including a start point node to an end point area including an end point node using the first network graph, and a second route search unit that searches for one or more second routes from the start point node to the end point node using a second network graph that represents a connection relationship between the nodes and the edge in areas included in the first routes.

Advantageous Effects of Invention

According to an embodiment of the present invention, an appropriate route can be efficiently searched for in a communication network including a plurality of nodes and edges connecting the nodes.

BRIEF DESCRIPTION OF DRAWINGS

FIG. 3 is a diagram illustrating a configuration example of an optical transmission network according to the present embodiment.

FIG. 5A is a diagram (1) illustrating an example of a topology information DB according to the present embodiment.

FIG. 5B is a diagram (2) illustrating an example of the topology information DB according to the present embodiment.

FIG. 6 is a diagram illustrating an example of an area division information DB according to the present embodiment.

FIG. 9 is a diagram illustrating an example of a result of the macro search according to Example 1.

FIG. 11 is a diagram illustrating an example of a result of the micro search according to Example 1.

DESCRIPTION OF EMBODIMENTS

Hereinafter, an embodiment of the present invention (present embodiment) will be described with reference to the drawings. The embodiment to be described below is merely an example, and an embodiment to which the present invention is applied is not limited to the following embodiment.

<System Configuration>

Figure 1:
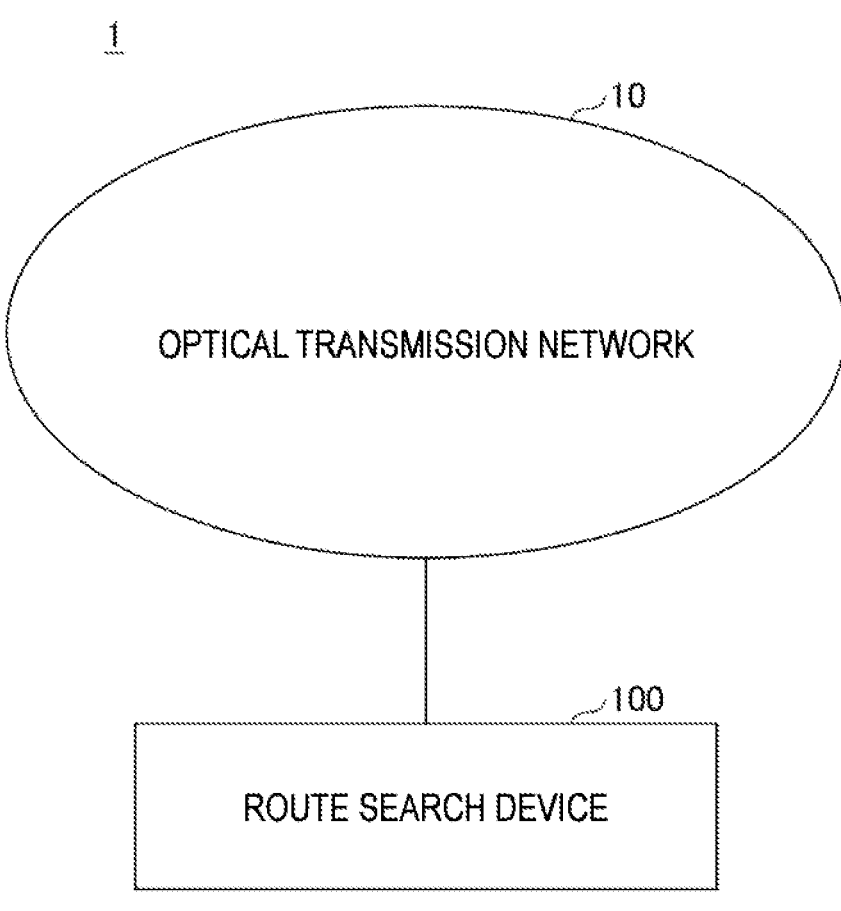
FIG. 1 is a diagram illustrating a configuration example of a route search system according to the present embodiment.

FIG. 1 is a diagram illustrating a configuration example of a route search system according to the present embodiment. The route search system 1 includes a route search device 100 that is a computer that searches for an appropriate route from a start point node to an end point node in an optical transmission network 10.

The optical transmission network (communication network) 10 is a backbone network such as an Internet protocol (IP) communication network that implements communication using optical signals. Note that the optical transmission network 10 is an example of a communication network including a plurality of nodes and edges connecting the nodes. Here, the nodes include, for example, a communication device or a communication building included in the optical transmission network 10. The edges include a transmission path such as an optical fiber. Note that the edges may be referred to as links.

<Configuration of Route Search Device>

Figure 2:
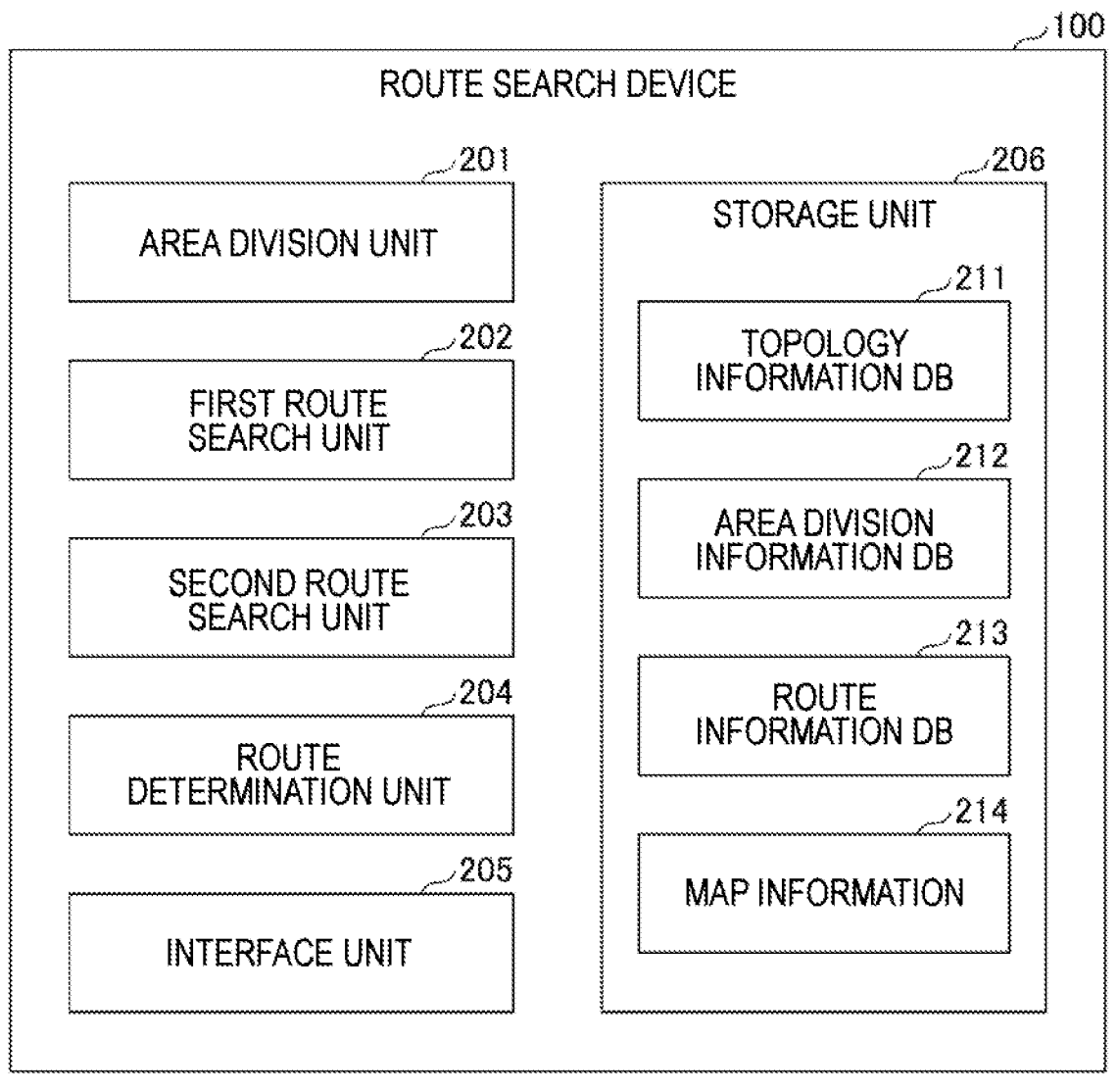
FIG. 2 is a diagram illustrating a configuration example of a route search device according to the present embodiment.

FIG. 2 is a diagram illustrating a configuration example of a route search device according to the present embodiment. The route search device 100 implements, for example, an area division unit 201, a first route search unit 202, a second route search unit 203, a route determination unit 204, an interface unit 205, a storage unit 206, and the like by executing a predetermined program. Note that each functional element described above may be distributed and arranged in a plurality of computers. At least part of the functional elements described above may be implemented by hardware.

The area division unit 201 divides the optical transmission network 10 including the plurality of nodes and edges connecting the nodes into a plurality of areas based on information of the nodes, and creates a network graph for macro search indicating a connection relationship between the areas obtained by dividing.

Figure 3:
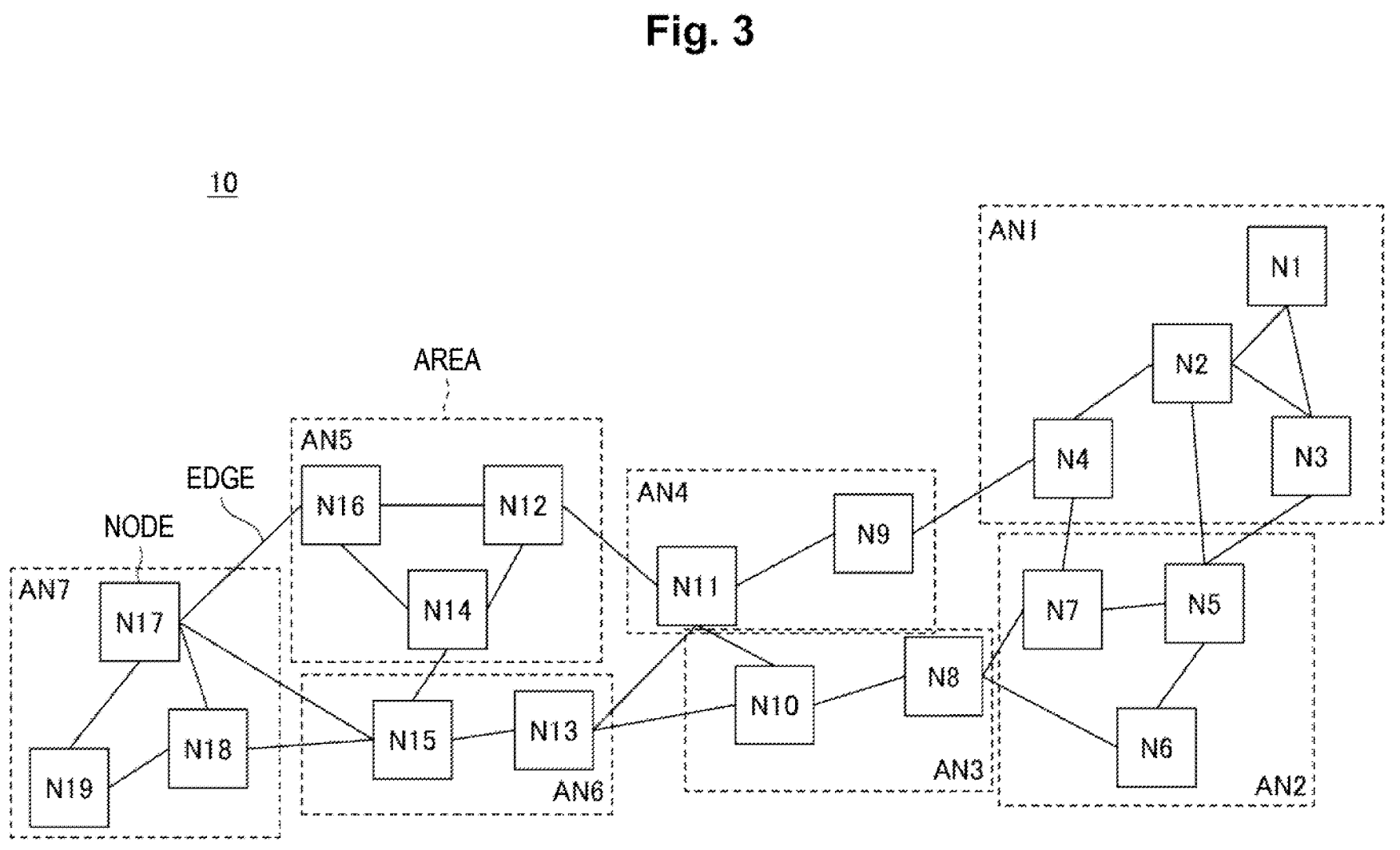

FIG. 3 is a diagram illustrating a configuration example of the optical transmission network according to the present embodiment. In FIG. 3, the optical transmission network (communication network) 10 includes a plurality of nodes (N1 to N19) and edges connecting the nodes. Note that the optical transmission network 10 is an example of a communication network.

For example, the area division unit 201 divides the optical transmission network 10 as illustrated in FIG. 3 into a plurality of areas (AN1 to AN7) indicated by broken lines based on information of the nodes. Here, the information of the nodes may include, for example, various types of information such as coordinate information (position information) indicating the positions of the nodes, information indicating communication demand of the nodes, or distances from the nodes (for example, distances within which light reaches from the nodes without amplification). Furthermore, the area division unit 201 creates a network graph for macro search indicating a connection relationship between the plurality of areas obtained by dividing (AN1 to AN7).

Figure 4:
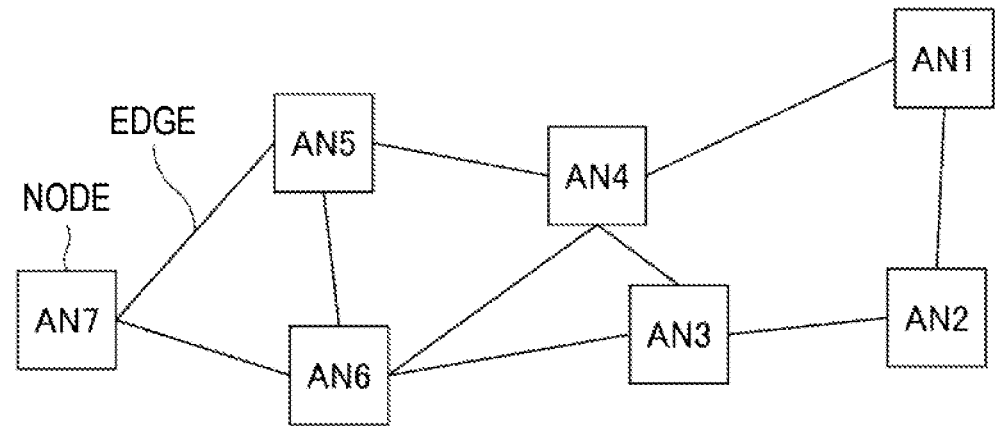
FIG. 4 is a diagram illustrating an example of a network graph for macro search according to the present embodiment.

FIG. 4 is a diagram illustrating an example of the network graph for macro search according to the present embodiment. The network graph (first network graph) 400 for macro search is an undirected graph in which the plurality of areas obtained by dividing (AN1 to AN7) is set as nodes and the areas are connected by edges. Note that the network graph 400 for macro search is an example of a first network graph.

Here, referring back to FIG. 2, the description of the functional configuration of the route search device 100 will be continued. The first route search unit 202 searches for one or more routes from an area including a start point node (hereinafter, referred to as a start point area) to an area including an end point node (hereinafter, referred to as an end point area) using the created macro search network graph 400 (hereinafter, the search is referred to as macro search).

For example, the first route search unit 202 searches for one or more routes (hereinafter, referred to as first routes) from the start point area to the end point area using known Dijkstra's algorithm or the like using the network graph 400 for macro search as illustrated in FIG. 4. Dijkstra's algorithm is a method of setting weight indicating how much cost (for example, distance) is required to pass through nodes or edges to the nodes and the edges included in a communication network, and determining a route having the smallest weight. Note that the first route search unit 202 may search for a first route by a method other than Dijkstra's algorithm.

The second route search unit 203 creates network graphs (second network graphs) for micro search indicating a connection relationship between nodes and edges in areas included in the first routes searched for by the first route search unit 202. Furthermore, the second route search unit 203 searches for one or more routes from the start point node to the end point node using the created network graphs for micro search (hereinafter, the search is referred to as micro search). Note that the network graphs for micro search are an example of second network graphs.

For example, the second route search unit 203 searches for one or more routes (hereinafter, referred to as second routes) from the start point node to the end point node using the known Dijkstra's algorithm or the like using the network graphs for micro search. Note that the second route search unit 203 may search for a second route by a method other than Dijkstra's algorithm.

The route determination unit 204 determines one or more second routes that satisfy a requirement from the one or more second routes searched for by the second route search unit 203.

The Interface unit 205 provides a user interface (UI) by which a user uses a route search function provided by the route search device 100, an application programming interface (API) by which a user uses the route determination function provided by the route search device 100 from another device or the like, or the like. For example, a user (or another device or the like) can set search conditions and the like including a start point node, an end point node, and the like in the optical transmission network 10 using the interface unit 205. Furthermore, a user (or another device or the like) can acquire a result of route determination processing by the route search device 100 and the like using interface unit 205.

The storage unit 206 stores, for example, various types of information including a topology information database (DB) 211, an area division information DB 212, and a route information DB 213, data, and the like.

(Topology Information DB)

FIGS. 5A and 5B are diagrams illustrating examples of the topology information DB according to the present embodiment. The topology information DB 211 stores, for example, topology information 501 as illustrated in FIG. 5A, topology information 502 as illustrated in FIG. 5B, and the like.

FIG. 5A illustrates an example of the topology information 501 indicating the connection relationship between the nodes and the edges included in the optical transmission network 10, for example, as illustrated in FIG. 3. In the example of FIG. 5A, the topology information 501 includes, as items, information such as "nodes A", "nodes Z", "distances", and "edge numbers".

The "nodes A" include information of the "numbers" and the "node types" of nodes connected to one ends of the edges (nodes A). The "numbers" are identifiers for identifying the nodes A. The "node types" are attribute information of the nodes A in a case where there is a plurality of types of nodes. Here, it is assumed that there are three attributes of nodes of an optical cross connect (OXC), a repeater (REP), and a through (Thru).

Here, the OXC is an optical cross-connect that switches wavelength-multiplexed signals in units of wavelengths in the optical transmission network 10. The REP is an optical repeater that relays optical signals. Thru is, for example, a connection point of an optical fiber by fusion splicing or the like.

The "nodes Z" include information of the "numbers" and the "node types" of nodes connected to the other ends of the edges (nodes Z). The "numbers" are identifiers for identifying the nodes Z. The "node types" are attribute information of the nodes Z in a case where there is a plurality of types of nodes. For example, FIG. 5A illustrates that an edge having an edge number "1001" is connected between a node having a node number "N1" (node N1) and a node having a node number "N2" (node N2).

The "distances" are information indicating distances of the edges (lengths of transmission paths between the nodes A and the nodes Z). The "edge numbers" are identifiers for identifying the edges.

FIG. 5B illustrates an example of the topology information 502 indicating the connection relationship among the nodes included in the network graph 400 for macro search, for example, as illustrated in FIG. 4. In the example of FIG. 5B, the topology information 502 includes information of "nodes A" and "nodes Z" as items, and indicates that the "nodes A" and the "nodes Z" are connected by edges. For example, the example of FIG. 5B illustrates that a node "AN1" and a node "AN2", the node "AN2" and a node "AN3", and a node "AN6" and a node "AN7" are connected by respective edges.

(Area Division Information DB)

FIG. 6 is a diagram illustrating an example of the area division information DB according to the present embodiment. The area division information DB 212 stores, in advance, information used for dividing the optical transmission network 10 into a plurality of areas. In the example of FIG. 6, the area division information DB 212 stores the coordinate information indicating the positions of the nodes included in the optical transmission network 10. In the example of FIG. 6, the coordinate information is x coordinates and y coordinates, but the coordinate information may be latitude and longitude, or the like.

As an example, the area division unit 201 may divide the optical transmission network 10 into a plurality of areas based on the coordinate information of the nodes and geographical information such as prefectures. As another example, the area division unit 201 may display a plurality of the nodes on a map based on the coordinate information of the nodes, and divide the optical transmission network 10 into a plurality of areas according to a setting operation or the like by a user using the interface unit 205. In this case, the route search device 100 may store map information 214 in the storage unit 206, or may acquire the map information 214 from an external server or the like.

Note that the area division information DB 212 illustrated in FIG. 6 is an example. For example, in the area division information DB 212, information indicating communication demand of the nodes and the like in addition to the coordinate information of the nodes may be stored in advance. Here, the communication demand is, for example, information such as communication bandwidths required for the nodes (numbers of wavelength paths and the like in a case where the nodes are OXCs). In this case, the area division unit 201 may divide the optical transmission network 10 into a plurality of areas based on the communication demand of the nodes. Furthermore, the route search device 100 may divide the optical transmission network 10 into a plurality of areas based on the distances r that light reaches from the nodes without amplification.

Note that the functional configuration of the route search device 100 illustrated in FIG. 2 is an example. For example, the first route search unit 202 and the second route search unit 203 included in the route search device 100 may be one route search unit. Furthermore, the storage unit 206 may be a storage device outside the route search device 100 (for example, a storage server or the like).

<Flow of Processing>

Next, a flow of processing of a route search method according to the present embodiment will be described.

Example: 1

Figure 7:
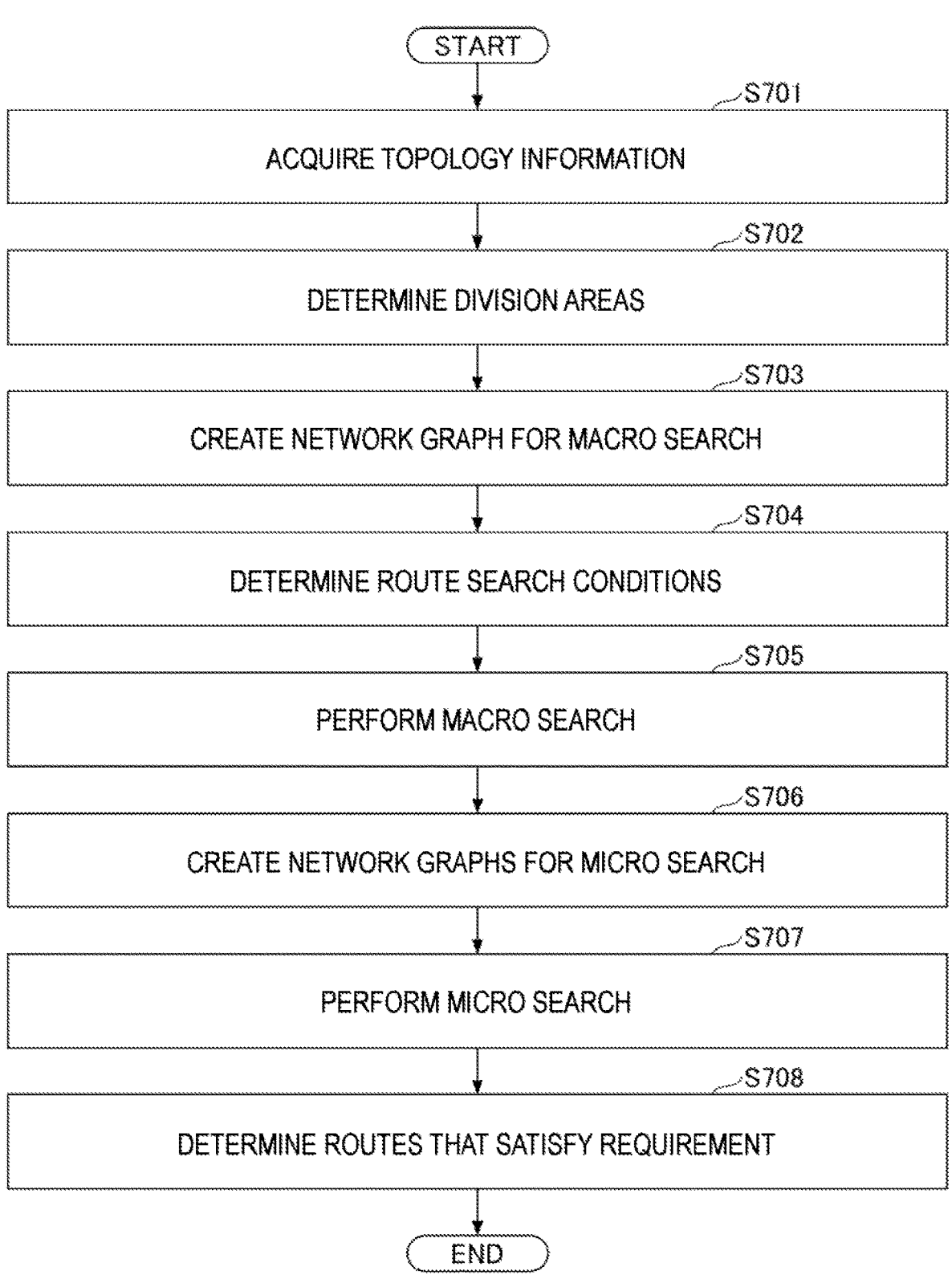
FIG. 7 is a flowchart illustrating an example of route search processing according to Example 1.

FIG. 7 is a flowchart illustrating an example of route search processing according to Example 1. This processing illustrates an example of the route search processing in which the route search device 100 searches for routes from a start point node to an end point node in the optical transmission network 10, for example, as illustrated in FIG. 3. Note that, in actual path design of the optical transmission network 10, securing two or more routes is common for the purpose of improving reliability or the like, and thus, here, an example of processing in a case of searching for two routes in which nodes and edges are not repeated will be described.

In step S701, the area division unit 201 acquires, for example, the topology information 501 of the optical transmission network 10 as illustrated in FIG. 5A from the topology information DB 211. As a result, the area division unit 201 can grasp the configuration of the optical transmission network 10, for example, as illustrated in FIG. 3.

In step S702, the area division unit 201 determines division areas for dividing the optical transmission network 10 into a plurality of areas. In Example 1, the area division unit 201 divides the optical transmission network 10 into a plurality of areas as indicated by broken lines in FIG. 3 based on the coordinate information of the nodes stored in the area division information DB 212 and area information of prefectures and the like included in the map information 214.

In step S703, the area division unit 201 creates the network graph (first network graph) 400 for macro search that represents a connection relationship among the plurality of areas obtained by dividing (AN1 to AN7), for example, as illustrated in FIG. 4.

For example, the area division unit 201 defines each of the areas obtained by dividing (AN1 to AN7) as a node. In the following description, the areas (AN1 to AN7) defined as nodes are referred to as "area nodes" so as to be distinguished from the nodes (N1 to N19). Subsequently, in a case where a node included in one area node is connected to a node included in another area node, the area division unit 201 determines that the one area node and said another area node are in the connection relationship, and connects the one area node and said another area node by an edge. The area division unit 201 performs similar processing on all the area nodes, and creates, for example, the network graph 400 for macro search as illustrated in FIG. 4. Note that the area division unit 201 connects edges such that a plurality of edges does not exist in the same section.

In step S704, the first route search unit 202 determines route search conditions. For example, the first route search unit 202 sets the start point node, the end point node, and the like received from a user (or another device or the like) using the interface unit 205 as route search conditions. Here, as an example for description, the following description will be given on the assumption that the node "N2" is the start point node and a node "N8" is the end point node in the optical transmission network 10 as illustrated in FIG. 3.

In step S705, the first route search unit 202 searches for one or more first routes from an area node including the start point node (hereinafter, referred to as a start point area) to an area node including the end point node (hereinafter, referred to as an end point area) using the macro search network graph 400 created by the area division unit 201.

Figure 8:
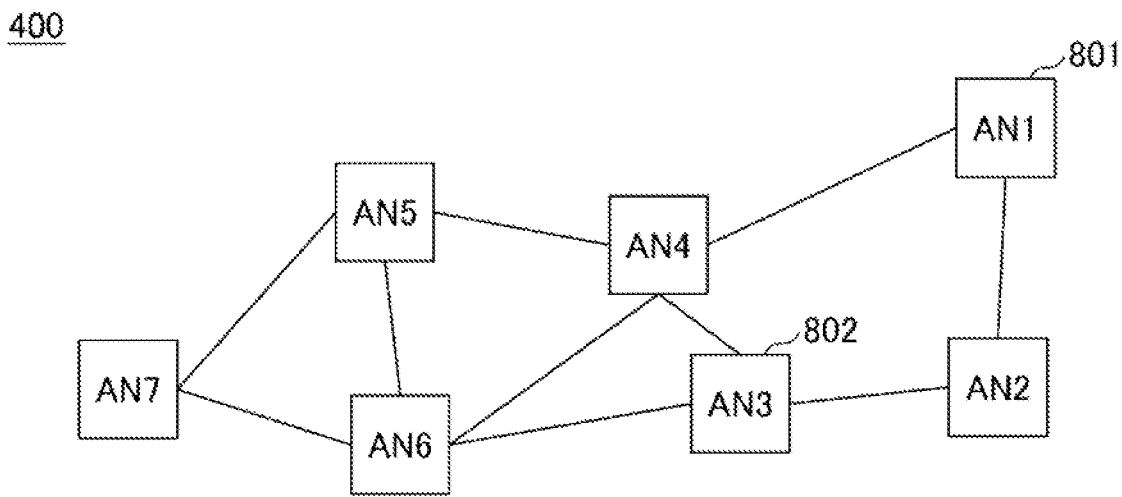
FIG. 8 is a diagram for describing macro search according to Example 1.

FIG. 8 is a diagram for describing macro search according to Example 1. In FIG. 8, the area node "AN1" is the start point area 801 including the node "N2" as the start point node, and the area node "AN3" is the end point area 802 including the node "N8" as the end point node.

First, the first route search unit 202 performs full search for first first routes (one set of first routes) from start point area 801 to end point area 802. Subsequently, the first route search unit 202 sequentially searches for second first routes (another set of first routes) for the respective first first routes obtained by the full search. Note that, in the present Example, as an example, two first routes (first first routes and second first routes) are searched for, but the present invention is not limited thereto, and the number of first routes searched for by the first route search unit 202 may be any other number greater than or equal to one.

Preferably, when searching for another set of first routes, the first route search unit 202 excludes nodes (area nodes) and edges (edges between the area nodes) included in the one set of first routes from the network graph 400 for macro search and searches for second first routes. Accordingly, backup can be performed by said another set of first routes, for example, in a case where a failure occurs in the one set of first routes.

Note that, when the first route search unit 202 searches for first routes, the shortest routes may be searched for by weighting the nodes (area nodes), the edges, and the like of the network graph 400 for macro search using, for example, distances, the numbers of hops, and the like.

FIG. 9 is a diagram illustrating an example of a result of the macro search according to Example 1. In the result 900 of the macro search illustrated in FIG. 9, "area route information 1" corresponds to the first first routes (one set of first routes), and "area route information 2" corresponds to the second first routes (another set of first routes). In this manner, a plurality of combinations of candidates of the first first routes and the second first routes can be obtained by the macro search in step S705.

In step S706, the second route search unit 203 creates network graphs (second network graphs) for micro search indicating a connection relationship between nodes and edges in areas included in the first routes searched for by the first route search unit 202.

Figure 10A:
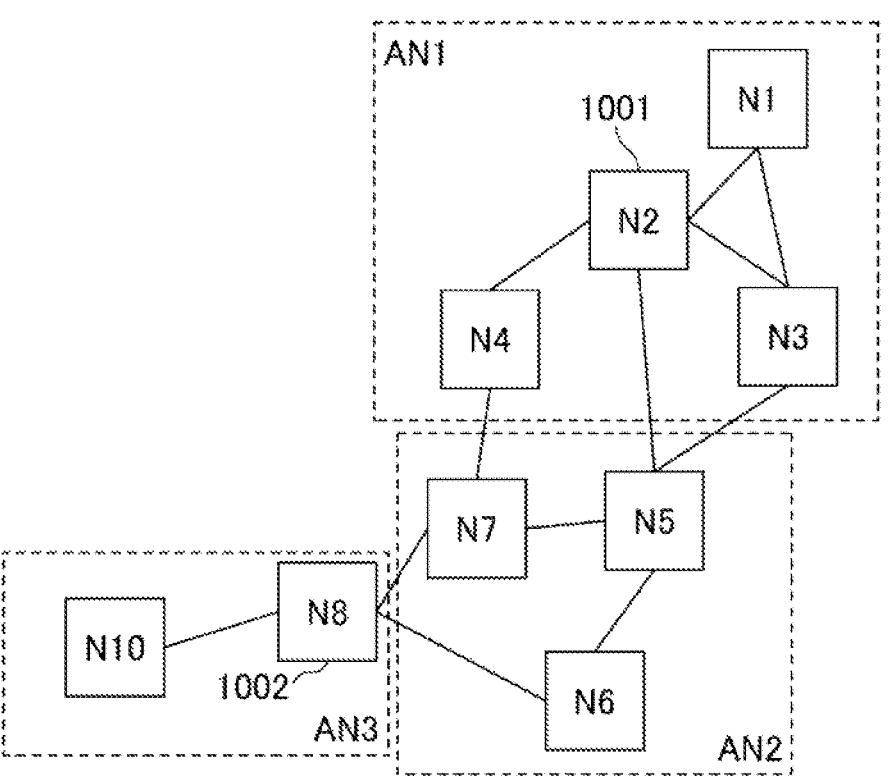
FIG. 10A is a diagram (1) illustrating an example of a network graph for micro search according to Example 1.
Figure 10B:
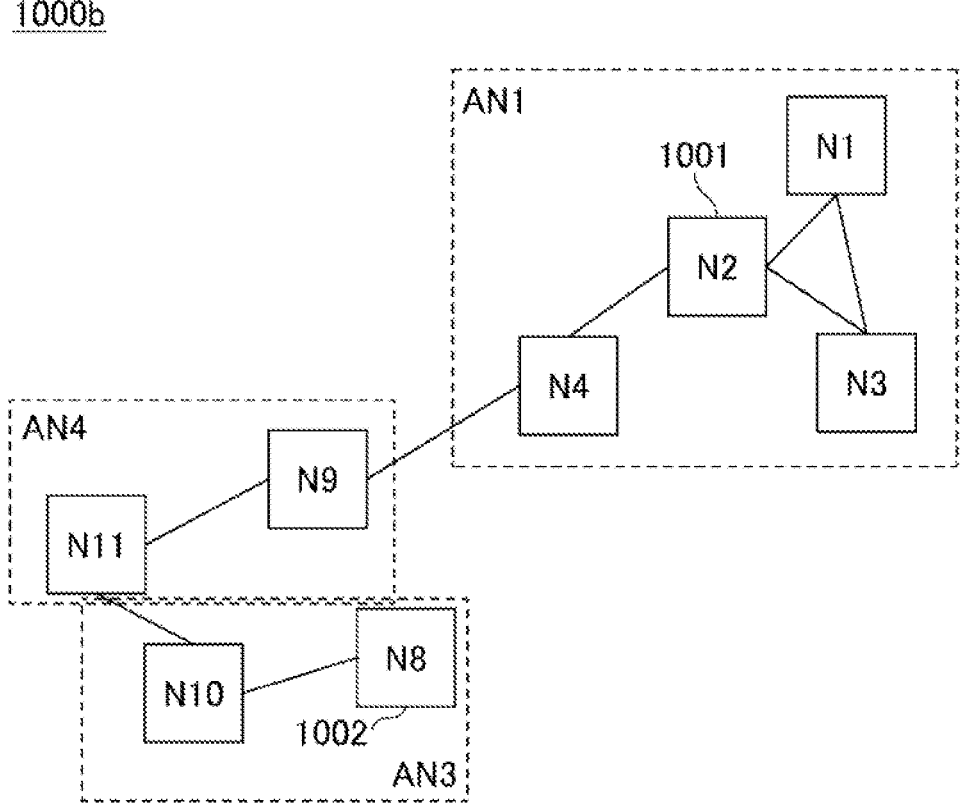
FIG. 10B is a diagram (2) illustrating an example of a network graph for the micro search according to Example 1.

FIGS. 10A and 10B are diagrams illustrating examples of the network graphs for micro search according to Example 1. FIG. 10A illustrates an example of a network graph 1000a for micro search corresponding to the area route information 1 "AN1-AN2-AN3" in the result 900 of the macro search illustrated in FIG. 9, for example. In this case, the second route search unit 203 excludes areas "AN4" to "AN7" other than areas "AN1", included in a first route from the optical transmission network 10 as illustrated in FIG. 3 and creates the network graph 1000a for micro search.

FIG. 10B illustrates an example of a network graph 1000b for micro search corresponding to the area route information 2 "AN1-AN4-AN3" in the result 900 of the macro search illustrated in FIG. 9, for example. In this case, the second route search unit 203 excludes areas "AN2" and "AN5" to "AN7" other than areas "AN1", "AN4", and "AN3"

included in a second route from the optical transmission network 10 as illustrated in FIG. 3, and creates the network graph 1000a for micro search. The second route search unit 203 creates the network graphs 1000a and 1000b for the micro search for each candidate included in the macro search result 900 as illustrated in FIG. 9.

In step S707, the second route search unit 203 searches for one or more second routes from the start point node to the end point node using the created network graphs for micro search. For example, the second route search unit 203 searches for a first second route (one second route) from the node "N2" that is the start point node 1001 to the node "N8" that is the end point node 1002 using the network graph 1000a for micro search as illustrated in FIG. 10A. Furthermore, the second route search unit 203 searches for a second second route (another second route) from the node "N2" that is the start point node 1001 to the node "N8" that is the end point node 1002 using the network graph 1000b for micro search as illustrated in FIG. 10B.

At this time, in the area "AN1" that is the start point area and the area "AN3" that is the end point area, there is a possibility that edges or nodes are repeated between the two second routes. Therefore, after searching for the first second route, the second route search unit 203 searches for the second second route such that the edges and the nodes in the first second route are not repeated.

The second route search unit 203 performs micro search on each candidate included in the result 900 of the macro search as illustrated in FIG. 9, and obtains a first second route and a second second route. Furthermore, the second route search unit 203 stores the result of the micro search in the route information DB 213, for example, as illustrated in FIG. 11.

FIG. 11 is a diagram illustrating an example of the result of the micro search according to Example 1. This diagram illustrates an image of an example of the route information DB 213 in which the result of the micro search by the second route search unit 203 is stored. In the example of FIG. 11, the route information DB 213 includes information such as "routes 1", "routes 2", "distance sums", and "OXC number sums" as items. Furthermore, the "routes 1" and the "routes 2" each include items including "route information", "total distances", and "numbers of OXCs".

The "route information" of the "routes 1" is information indicating first second routes searched for by the second route search unit 203. The "total distances" of the "routes 1" are total distances of the first second routes, and are calculated by the second route search unit 203 or the like using, for example, information of the "distances" of the topology information 501 of the optical transmission network 10 as illustrated in FIG. 5A. The "numbers of OXCs" of the "routes 1" are the numbers of OXCs through which the first second routes pass, and are calculated, for example, by the second route search unit 203 or the like based on information of the "node types" of the topology information 501 of the optical transmission network 10.

The "route information" of the "routes 2" is information indicating second second routes searched for by the second route search unit 203. The "total distances" of the "routes 2" are the total distances of the second second routes. The "numbers of OXCs" of the "routes 2" are the numbers of OXCs through which the second second route pass. The "distance sums" are the sums of the "total distances" of the "routes 1" and the "total distances" of the "routes 2". The "OXC number sums" are the sums of the "numbers of OXCs" of the "routes 1" and the "numbers of OXCs" of the "routes 2".

In step S708, the route determination unit 204 determines a combination of second routes that meet a requirement as the two routes among combinations of the second routes searched for by the second route search unit 203. For example, in a case of creating two second routes having the smallest "distance sum", the route determination unit 204 determines second routes "N2-N5-N7-N8" and "N2-N4-N9-N11-N10-N8" having the smallest "distance sum" as the two second routes from the route information DB 213 as illustrated in FIG. 11.

The processing described above enables the route search device 100 to efficiently search for an appropriate route in the optical transmission network (communication network) 10 including a plurality of nodes and edges connecting the nodes.

Example 2

Figure 12:
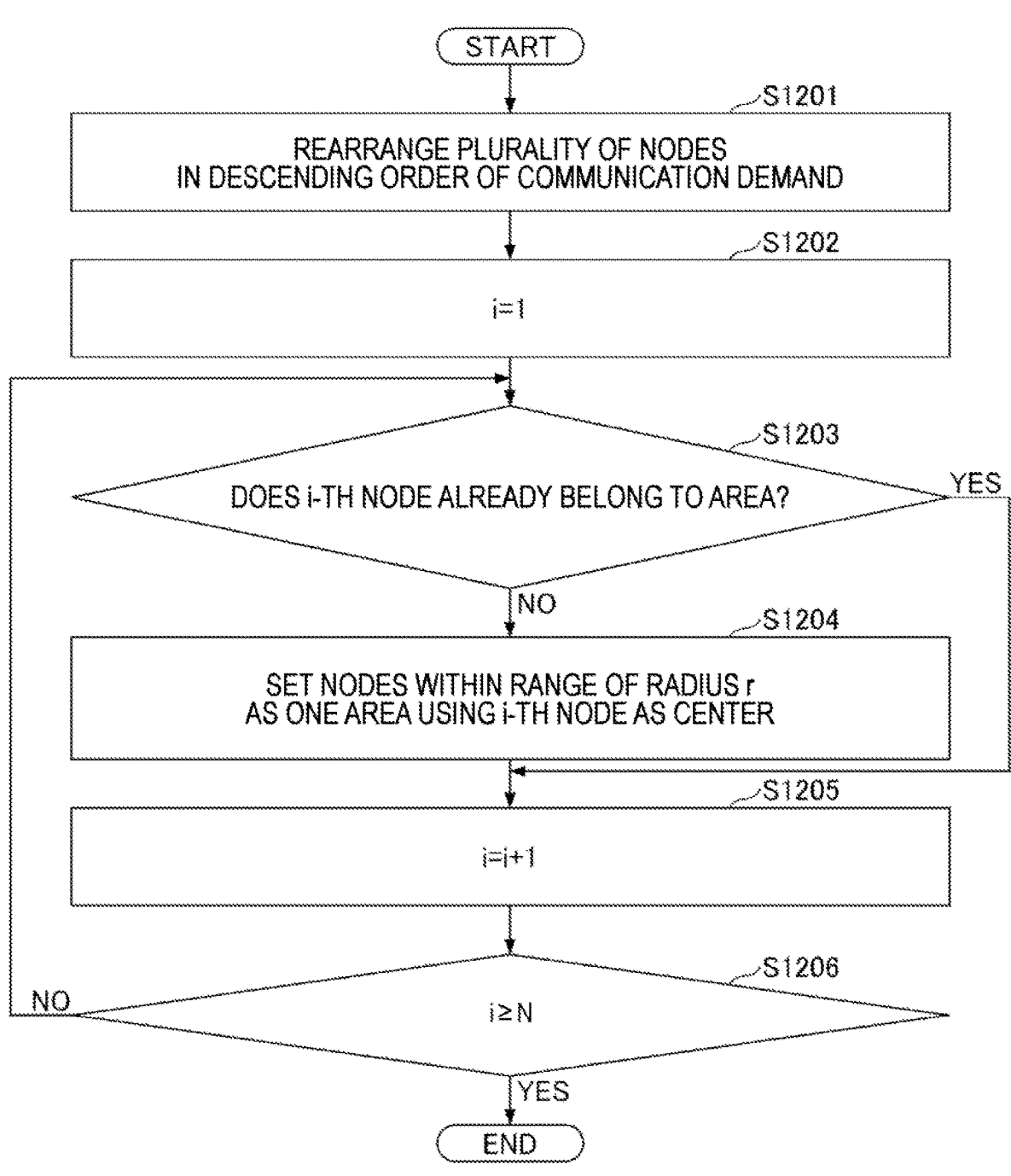
FIG. 12 is a flowchart illustrating an example of division area determination processing according to Example 2.

FIG. 12 is a flowchart illustrating an example of division area determination processing according to Example 2. This processing is another example of division area determination processing performed by the area division unit 201 in step S702 of FIG. 8, for example.

In step S1201, the area division unit 201 rearranges the plurality of nodes included in the optical transmission network 10 in descending order of the communication demand.

In Example 2, the route search device 100 stores information indicating the amounts of the communication demand of the respective nodes in addition to the coordinate information in the area division information DB 212 as illustrated in FIG. 6. For example, the route search device 100 stores communication bandwidths required for the respective nodes as information indicating the amounts of the communication demand of the respective nodes, or the numbers of wavelength paths and the like as information indicating the amounts of the communication demand in a case where the nodes are the numbers of OXCs in the area division information DB 212. Accordingly, the area division unit 201 can refer to the area division information DB 212 and rearrange the plurality of nodes included in the optical transmission network 10 in descending order of the communication demand. Note that the area division information DB 212 is an example of information of nodes.

In step S1202, the area division unit 201 sets a variable i to 1 and performs processing of steps S1203 to S1206.

In step S1203, the area division unit 201 determines whether an i-th node already belongs to an area. In a case where the i-th node does not belong to an area, the area division unit 201 shifts the processing to step S1204. On the other hand, in a case where the i-th node already belongs to any area, the area division unit 201 stops processing of step S1204 and shifts the processing to step S1205.

When the processing proceeds to step S1204, the area division unit 201 sets nodes within a range of a radius r as one area using the i-th node as the center, for example. For example, the area division unit 201 sets a distance that light reaches without amplification as the radius r. However, the method of determining the radius r is not limited thereto.

As another example, the area division unit 201 may set nodes in which the distances of the edges from the i-th node are within a predetermined range as one area instead of the radius r.

In step S1205, the area division unit 201 adds 1 to the variable i. Furthermore, in step S1206, the area division unit 201 determines whether the value of the variable i is equal to or more than the number N of the nodes included in the optical transmission network 10. In a case where the value of the variable i is N or more, the area division unit 201 determines that the processing has been completed for all the nodes included in the optical transmission network 10, and ends the processing of FIG. 12. On the other hand, in a case where the value of the variable i is less than N, the area division unit 201 determines that the processing has not been completed for all the nodes included in the optical transmission network 10, and returns the processing to step S1203.

The processing described above enables the area division unit 201 to divide the optical transmission network 10 into a plurality of areas based on the communication demand of the nodes included in the optical transmission network 10.

Modification

In step S1201 of FIG. 12, the area division unit 201 may rearrange the plurality of nodes included in the optical transmission network 10 by a method other than the communication demand. For example, the area division unit 201 may assign numbers to the respective nodes in order from a node at any originating point. As a result, for example, as illustrated in FIG. 3, numbers N1 to N19 can be set to the respective nodes included in the optical transmission network 10.

In this case, the area division unit 201 may perform processing of step S1203 in FIG. 12 on Ni (N1, N2, . . . . N19).

<Hardware Configuration Example>

The route search device 100 according to the present embodiment can be implemented, for example, by a computer being caused to execute a program in which the processing contents described in the present embodiment are described.

The program can be stored and distributed by being recorded in a computer-readable recording medium (a portable memory or the like). Further, the program can be provided via a network such as the Internet or an electronic mail.

Figure 13:
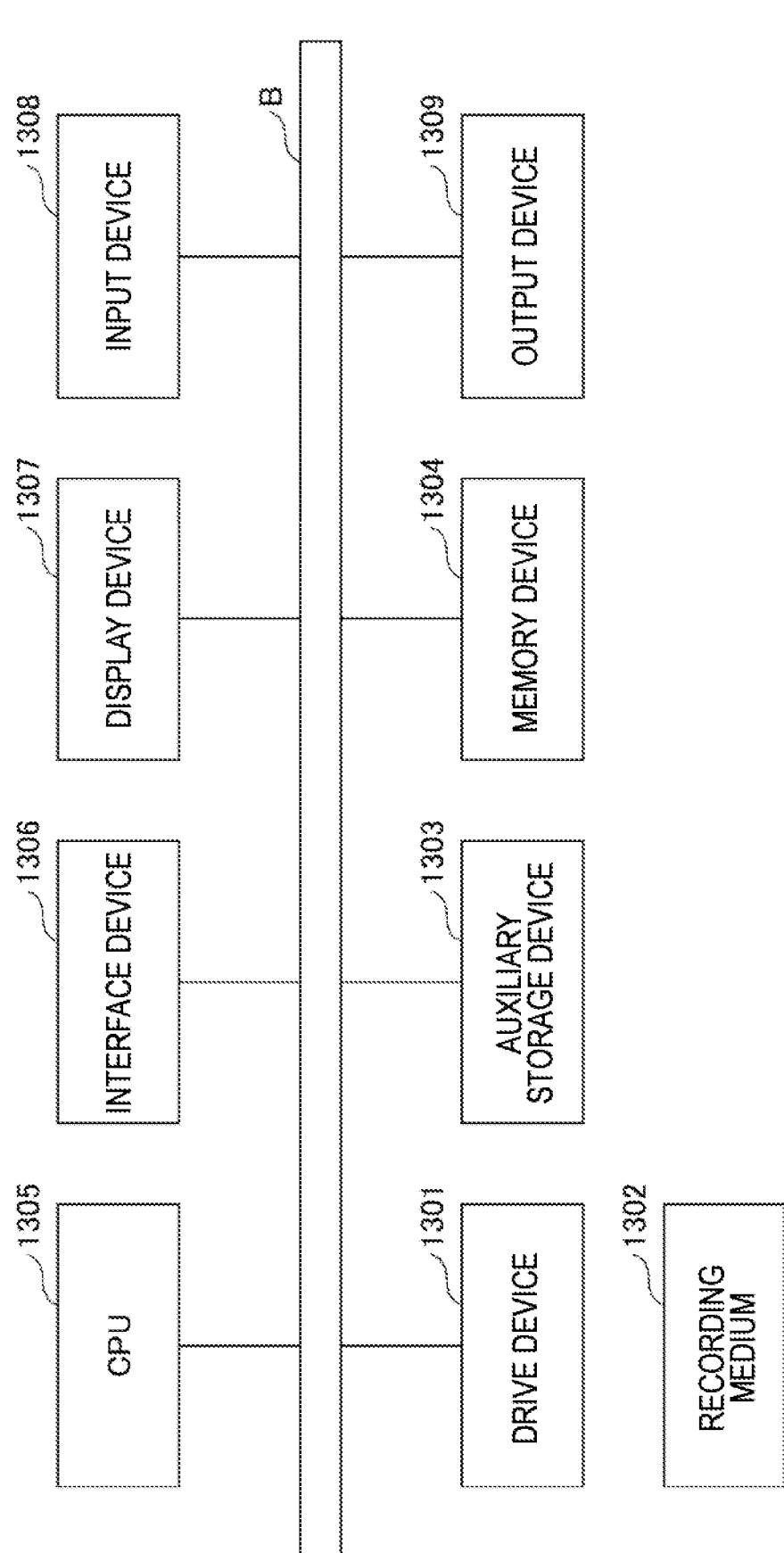
FIG. 13 is a diagram illustrating an example hardware configuration of a computer.

FIG. 13 is a diagram illustrating an example hardware configuration of a computer. A computer 1300 in the example in FIG. 13 includes a drive device 1301, an auxiliary storage device 1303, a memory device 1304, a central processing unit (CPU) 1305, an interface device 1306, a display device 1307, an input device 1308, and an output device 1309 that are connected to one another by a bus B.

The program for performing processing in the computer 1300 is provided through a recording medium 1302 such as a CD-ROM or a memory card, for example. When the recording medium 1302 that stores the program is set in the drive device 1301, the program is installed from the recording medium 1302 into the auxiliary storage device 1303 via the drive device 1301. However, the program is not necessarily installed from the recording medium 1302, but may be downloaded from another computer via a network. The auxiliary storage device 1303 stores the installed program, and also stores necessary files, data, and the like.

In a case where an instruction to start the program is issued, the memory device 1304 reads the program from the auxiliary storage device 1303, and stores the program therein. According to the program stored in the memory device 1304, the CPU 1305 implements the functions related to the respective components described in the present embodiment. The interface device 1306 is used as an interface for connecting to a network. The display device 1307 displays a graphic user interface (GUI) or the like by the program. The input device 1308 includes a keyboard and a mouse, buttons, a touch panel, and the like, and is used to input various operation instructions. The output device 1309 outputs a calculation result. Note that the route search device 100 may not include the display device 1307 and/or the input device 1308.

Effects of Embodiment

In the route search system 1 according to the present embodiment, the optical transmission network 10 as a route search target is divided into a plurality of areas based on information of nodes, and the network graph 400 for macro search is created using the areas obtained by dividing as nodes and setting of the areas as edges.

Furthermore, the route search system 1 performs macro search using the network graph 400 for macro search, identifies areas passed through from a start point node to an end point node, and performs micro search for routes from the start point node to the end point node within a range of the areas.

As a result, according to the route search system 1 according to the present embodiment, the rate at which similar routes are searched for can be reduced and routes that meet a requirement can be searched for. Furthermore, according to the route search system 1, unnecessary route candidates can be excluded from a large number of route candidates, and route candidates that meet a route determination requirement can be effectively searched for, and thus, the calculation time of route search can be reduced.

Furthermore, the route search processing according to the present embodiment facilitates efficient determination of redundant routes for the purpose of improving reliability.

As described above, according to the embodiment, an appropriate route can be efficiently searched for in a communication network including a plurality of nodes and edges connecting the nodes.

Summary of the Embodiment

The present description discloses a route search device, a route determination method, and a program in at least the following clauses.
(Clause 1)
A route search device including
an area division unit that divides a communication network including a plurality of nodes and an edge connecting the nodes into a plurality of areas based on information of the nodes, and creates a first network graph that represents a connection relationship between the areas,
a first route search unit that searches for one or more first routes from a start point area including a start point node to an end point area including an end point node using the first network graph, and
a second route search unit that searches for one or more second routes from the start point node to the end point node using a second network graph that represents a connection relationship between the nodes and the edge in areas included in the first routes.
(Clause 2)
The route search device according to the clause 1, in which the area division unit divides the communication network into the plurality of areas based on coordinate information indicating positions of the nodes.
(Clause 3)

The route search device according to the clause 1 or 2, in which
the communication network is an optical transmission network, and
the area division unit divides the communication network into the plurality of areas based on distances that light reaches from the nodes without amplification.
(Clause 4)
The route search device according to any one of the clauses 1 to 3, in which the area division unit divides the communication network into the plurality of areas based on communication demand of the nodes.
(Clause 5)
The route search device according to any one of the clauses 1 to 4, in which
the first route search unit
searches for one first route using the first network graph, and
excludes the nodes and the edge included in the one first route from the first network graph and searches for another first route.
(Clause 6)
The route search device according to the clause 5, in which
the second route search unit
searches for one second route from the start point node to the end point node using one second network graph in which the nodes and the edge are limited to the nodes and the edge in areas included in the one first route, and
searches for another second route from the start point node to the end point node using another second network graph in which the nodes and the edge are limited to the nodes and the edge in areas included in said another first route.
(Clause 7)
A route search method performed by a computer, the route search method including
processing of dividing a communication network including a plurality of nodes and an edge connecting the nodes into a plurality of areas based on information of the nodes, and creating a first network graph that represents a connection relationship between the areas,
processing of searching for one or more first routes from a start point area including a start point node to an end point area including an end point node using the first network graph, and
processing of searching for one or more second routes from the start point node to the end point node using a second network graph that represents a connection relationship between the nodes and the edge in areas included in the first routes.
(Clause 8)
A program causing a computer to perform processing, the processing including
processing of dividing a communication network including a plurality of nodes and an edge connecting the nodes into a plurality of areas based on information of the nodes, and creating a first network graph that represents a connection relationship between the areas,
processing of searching for one or more first routes from a start point area including a start point node to an end point area including an end point node using the first network graph, and
processing of searching for one or more second routes from the start point node to the end point node using a second network graph that represents a connection relationship between the nodes and the edge in areas included in the first routes.

Although the present embodiment has been described above, the present invention is not limited to such a specific embodiment, and various modifications and changes can be made within the scope of the present invention described in the claims.

REFERENCE SIGNS LIST

1 Route search system
10 Optical transmission network (communication network)
201 Area division unit
202 First route search unit
203 Second route search unit
204 Route determination unit
212 Area division information DB (example of information of nodes)
400 Network graph for macro search (first network graph)
801 Start point area
802 End point area
1000*a*, 1000*b* Network graph for micro search (second network graph)

The invention claimed is:

1. A route search device comprising:
a memory; and
a processor configured to:
divide a communication network including a plurality of nodes and an edge connecting the nodes into a plurality of areas based on information indicating communication demand of the nodes, and create a first network graph that represents a connection relationship between the areas;
search for one or more first routes from a start point area including a start point node to an end point area including an end point node using the first network graph; and
search for one or more second routes from the start point node to the end point node using a second network graph that represents a connection relationship between the nodes and the edge in areas included in the first routes,
wherein, in dividing the communication network into the plurality of areas, the processor is further configured to select nodes, among nodes that do not belong to any area, in descending order of communication demand and form an area by grouping the selected node together with nodes located within a predetermined range from the selected node.

2. The route search device according to claim 1, wherein the processor divides the communication network into the plurality of areas based on coordinate information indicating positions of the nodes.

3. The route search device according to claim 1, wherein the communication network is an optical transmission network, and
wherein the processor divides the communication network into the plurality of areas based on distances that light reaches from the nodes without amplification.

4. The route search device according to claim 1, wherein the processor divides the communication network into the plurality of areas based on communication demand of the nodes.

5. The route search device according to claim 1, wherein the processor searches for one first route using the first network graph, and

excludes the nodes and the edge included in the one first route from the first network graph and searches for another first route.

6. The route search device according to claim 5, wherein the processor searches for one second route from the start point node to the end point node using one second network graph in which the nodes and the edge are limited to the nodes and the edge in areas included in the one first route, and
searches for another second route from the start point node to the end point node using another second network graph in which the nodes and the edge are limited to the nodes and the edge in areas included in said another first route.

7. A route search method performed by a computer including a memory and a processor, the route search method comprising:
dividing a communication network including a plurality of nodes and an edge connecting the nodes into a plurality of areas based on information indicating communication demand of the nodes, and creating a first network graph that represents a connection relationship between the areas;
searching for one or more first routes from a start point area including a start point node to an end point area including an end point node using the first network graph; and
searching for one or more second routes from the start point node to the end point node using a second network graph that represents a connection relationship between the nodes and the edge in areas included in the first routes,
wherein, in dividing the communication network into the plurality of areas, the route search method further comprises selecting nodes, among nodes that do not belong to any area, in descending order of communication demand and form an area by grouping the selected node together with nodes located within a predetermined range from the selected node.

8. A non-transitory computer-readable recording medium having computer-readable instructions stored thereon, which, when executed, cause a computer including a memory and processor to perform processing, the processing comprising:
dividing a communication network including a plurality of nodes and an edge connecting the nodes into a plurality of areas based on information indicating communication demand of the nodes, and creating a first network graph that represents a connection relationship between the areas;
searching for one or more first routes from a start point area including a start point node to an end point area including an end point node using the first network graph; and
searching for one or more second routes from the start point node to the end point node using a second network graph that represents a connection relationship between the nodes and the edge in areas included in the first routes,
wherein, in dividing the communication network into the plurality of areas, the processing further comprises selecting nodes, among nodes that do not belong to any area, in descending order of communication demand and form an area by grouping the selected node together with nodes located within a predetermined range from the selected node.

9. The route search device according to claim 1, wherein the processor is further configured to rearrange the plurality of nodes in an order starting from an arbitrary starting node and assign numbers to the nodes based on the order, and divide the communication network including the plurality of nodes and the edge connecting the nodes into the plurality of areas using the numbers assigned to the nodes.

10. The route search device according to claim 1, wherein the processor is further configured to divide the communication network into the plurality of areas based on positional information of the nodes including coordinates of the nodes.

\* \* \* \* \*